United States Patent [19]

Ahl et al.

[11] Patent Number: 4,691,830

[45] Date of Patent: Sep. 8, 1987

[54] INSPECTION AND SORTING OF MOLDED CONTAINERS AS A FUNCTION OF MOLD OF ORIGIN

[75] Inventors: Alan D. Ahl, Toledo; Joseph F. Billmaier, Maumee; Paul W. L. Graham, Toledo, all of Ohio; Mark B. Schenk, Lexington, Ky.; Stephen H. Zylka, Toledo, Ohio

[73] Assignee: Owens-Illinois, Inc., Toledo, Ohio

[21] Appl. No.: 769,527

[22] Filed: Aug. 26, 1985

[51] Int. Cl.[4] ............................................. B07C 5/34
[52] U.S. Cl. .................................... 209/523; 65/29; 65/158; 73/45.1; 209/546; 209/555; 209/583; 364/473; 364/580
[58] Field of Search ................................ 209/522–524, 209/526, 546, 548, 549, 551, 555, 556, 558, 563, 564, 583, 591; 65/29, 158, DIG. 13; 73/37.6, 45,45.1, 45.2; 250/223 B; 364/468, 473, 476, 478, 552, 579, 580

[56] References Cited

U.S. PATENT DOCUMENTS

| | | | |
|---|---|---|---|
| 3,923,158 | 12/1975 | Fornaa | 209/526 |
| 4,047,000 | 9/1977 | Bryant et al. | 364/468 |
| 4,109,511 | 8/1978 | Powers, Jr. et al. | 209/538 X |
| 4,332,606 | 6/1982 | Gardner | 65/DIG. 13 X |
| 4,413,738 | 11/1983 | Pemberton et al. | 209/583 X |
| 4,431,436 | 2/1984 | Lulejian | 364/473 X |
| 4,639,263 | 1/1987 | Kulikauskas | 65/158 |

FOREIGN PATENT DOCUMENTS 3208976  5/1983  Fed. Rep. of Germany ...... 209/523

Primary Examiner—Robert B. Reeves
Assistant Examiner—Edward M. Wacyra
Attorney, Agent, or Firm—H. G. Bruss

[57] ABSTRACT

A completely automated system for inspection and sorting of molded containers, such as glass bottles, as a function of mold cavity of container origin. In a first system section, finished containers are one hundred percent inspected for defects, and a cavity identification device is controlled to reject all containers from cavities associated with defective containers. The cavity identification device is also coupled to feed sampled containers from selected cavities to an automatic sampling indexer wherein the sampled containers are fed to one or more stations for testing physical container properties, such as rupture pressure, wall thickness and internal volume. The cavity identification device and the automatic sampling indexer are controlled by a hierarchy of interconnected computers which receive cavity and test information from the various sections and stations of the system and control the sampling and sorting process based upon predetermined quality standards. A cavity map is maintained which relates cavity code to physical location in the container forming machine to help identify quality control trends.

12 Claims, 10 Drawing Figures

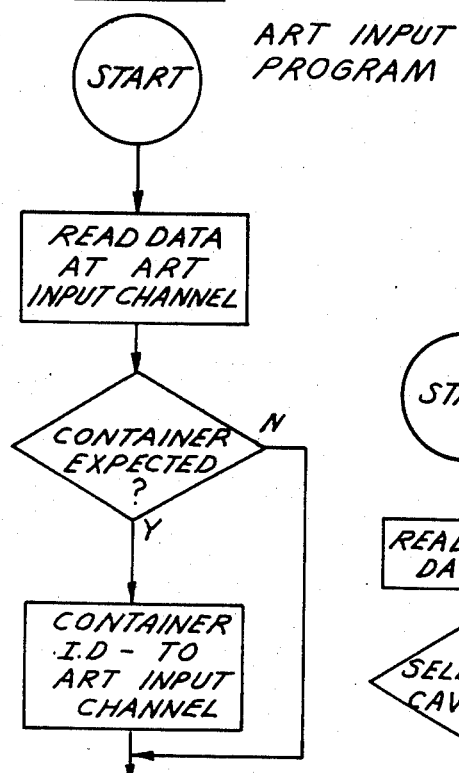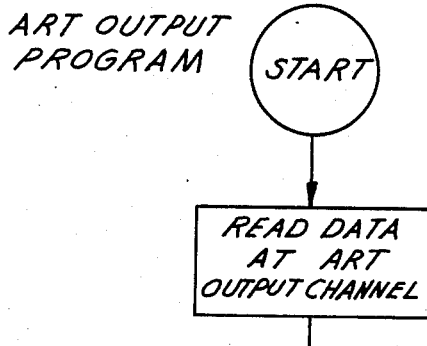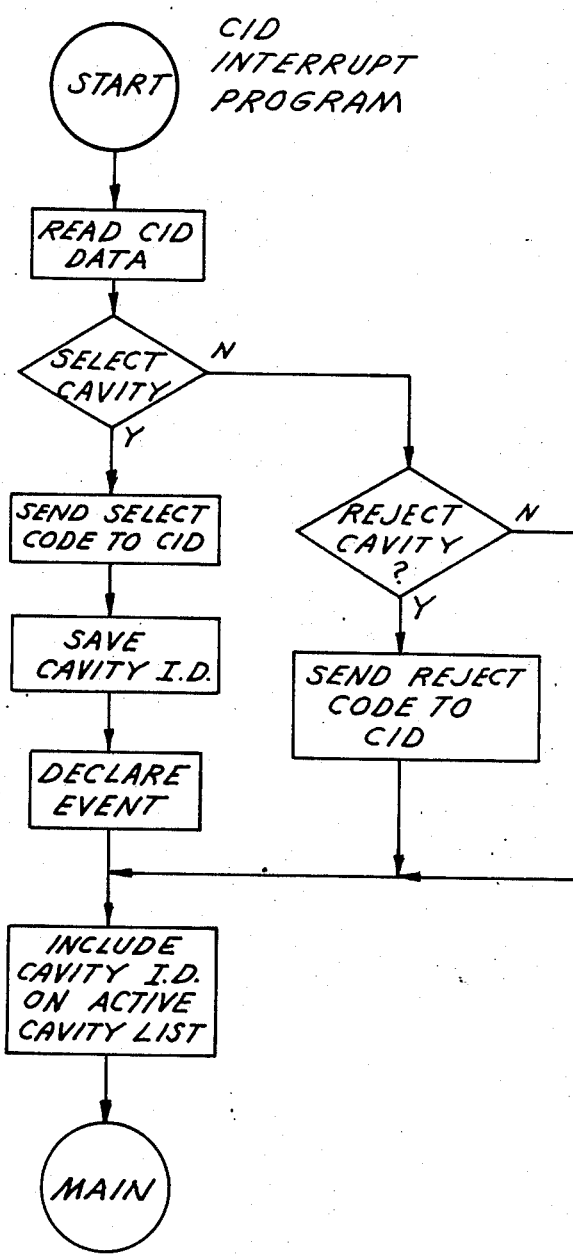

ART TEST PROGRAM

INSPECTION AND SORTING OF MOLDED CONTAINERS AS A FUNCTION OF MOLD OF ORIGIN

The present invention is directed to inspection of molded containers, and more particularly to a fully automated system and method for inspection and sorting of molded containers such as glass bottles on the basis of container mold of origin.

BACKGROUND AND OBJECTS OF THE INVENTION

Defects in molded containers such as glass bottles and jars are often related to defects in the associated molds of origin. For this reason, it is desirable in an automated manufacturing operation having a plurality of molds to possess the ability of identifying a specific molded container with its mold of origin, and of associating container defects with mold of origin for repair or replacement purposes. In an automated plant for manufacturing glass bottles, for example, a machine termed an individual section or IS machine includes a multiplicity of mold cavities and automated apparatus for feeding glass gobs through successive molds to blow the containers. The blown containers are then fed by suitable conveying apparatus to a lehr where annealing takes place, and then to a so-called cold end where inspection and sorting are performed prior to packaging of the containers for shipment. In view of the processing delay between the molding and inspection operations, it is desirable to identify potentially defective mold cavities at an early time in order to reduce scrap. In the same way, it is desirable after a mold cavity has been replaced or repaired to closely inspect containers from that cavity in order to certify proper operation.

U.S. Pat. No. 4,413,738 assigned to the assignee hereof discloses a system for one hundred percent inspection of molded containers for sidewall and finish defects, and for automatically sorting containers from mold cavities which are idenfied as defective. Each container is routed through one of a plurality of multi-station inspection devices for automated optical inspection of container sidewall and finish. A primary one of the inspection devices includes or has associated therewith an automated cavity inspection device for reading a code molded into each container and thereby associating containers passing through that inspection device with molds of origin. A finished product computer correlates defects in bottles passing through the primary inspection device to defective molds. All containers are then routed through a second cavity identification device at which containers originating at the molds identified as defective by the finished product computer are sorted for rejection.

Although the inspection system disclosed in the referenced patent has enjoyed substantial commercial success and economic benefit in operation, further automation remains desirable. For example, there are container test which must be performed on a sampled basis, such as container volume, wall thickness and pressure tests, that are not incorporated in the disclosed system. Currently, it is necessary to manually sample containers in order to perform these tests, whereas it would be desirable to implement such tests on an automated-sample basis based upon mold cavity of container origin. A further desirable feature is to provide defective cavity information with clarity and rapidity in such a way that it may be readily employed at the hot end, either manually or in automated processes, for implementing replacement or repair of defective mold cavities. A general object of the present invention is to provide a system and method for inspection of molded containers which implement the aforementioned desirable improvements over the prior art of the referenced patent.

A more specific object of the invention is to provide a fully automated system and method for one hundred percent inspection of molded containers for sidewall and finish defects, and for automatic sampled inspection of containers for pressure retention, wall thickness, internal volume and the like on the basis of cavity of origin.

A further object of the invention is to provide a system and method of the described character which include facility for varying sampling rate for the sampled inspection tests as a function of cavity identification for enhanced tracking of suspect cavities and/or for rapid certification of new or repaired cavities.

SUMMARY OF THE INVENTION

The present invention provides a completely automated system and method for inspection and sorting of molded containers, such as glass bottles, on the basis of mold cavity of origin. A hierarchy of interconnected computers receives cavity and test information from the various sections and stations of the system, and control the sorting and sampling process based upon predetermined quality standards. In a first system section, finished containers are conveyed through one of a plurality of inspection stations for one hundred percent inspection for defects such as sidewall and finish defects. At least one of such inspection stations has an associated sample cavity identification device for associating defects and defective containers with molds of origin. Defect and cavity identification information is transmitted to a finished product computer which controls a second or control cavity inspection device through which all containers are conveyed. Containers from cavities identified as defective are automatically sorted for rejection.

A second system section includes an automatic sampling indexer controlled by a cavity quality computer and coupled to the control cavity identification device to receive selected sample containers therefrom. The cavity quality computer is also connected to the finished product computer for directing selected sampling at the control cavity identification device. Thus, finish containers are selectively automatically sampled for testing on the basis of associated cavity identification. The automatic sampling indexer conveys the sampled containers to or through a plurality of automated quality testing stations, such as automatic volume, thickness and ramp or pressure test stations, and cavity identifications of containers determined to be defective are tracked and noted at the cavity quality computer. The sampling indexer also selectively feeds containers to a manual visual inspection station or to a reject station, if appropriate. Sampled containers which pass all non-destructive tests are returned to the main conveyor.

A cavity mold map is maintained in the cavity quality computer which relates cavity identification to physical location in the individual section or IS forming machine. Containers from cavities which do not appear on the map are one hundred percent sampled for a preselected number of containers to certify quality of the new cavity. Likewise, the cavity quality computer controls sampling of containers from cavities which are suspect or previously identified as defective to confirm or recertify quality of such cavities. In this way, cavity quality information is continuously and automatically maintained and updated, and is available to an operator or request.

In a fully automated plant for manufacture of glass containers, the cavity quality computer for each of a number of finished product inspection lines is coupled to a cold-end supervisory computer for collection and collation of all cavity quality information. The cold-end supervisory computer is connected to a corresponding supervisory computer in the hot-end or forming section of the plant for feeding cavity quality information thereto and obtaining therefrom information for updating the cavity maps in the various quality control computers. The cold-end and hot-end supervisory computers are also connected to a control system or master plant supervisory computer.

BRIEF DESCRIPTION OF THE DRAWINGS

The invention, together with additional objects, features and advantages thereof, will be best understood from the following description, the appended claims and the accompanying drawings in which:

FIGS. 3–10 are flow charts which illustrate operation of the cavity quality computer of FIG. 1.

DETAILED DESCRIPTION

Figure 1:
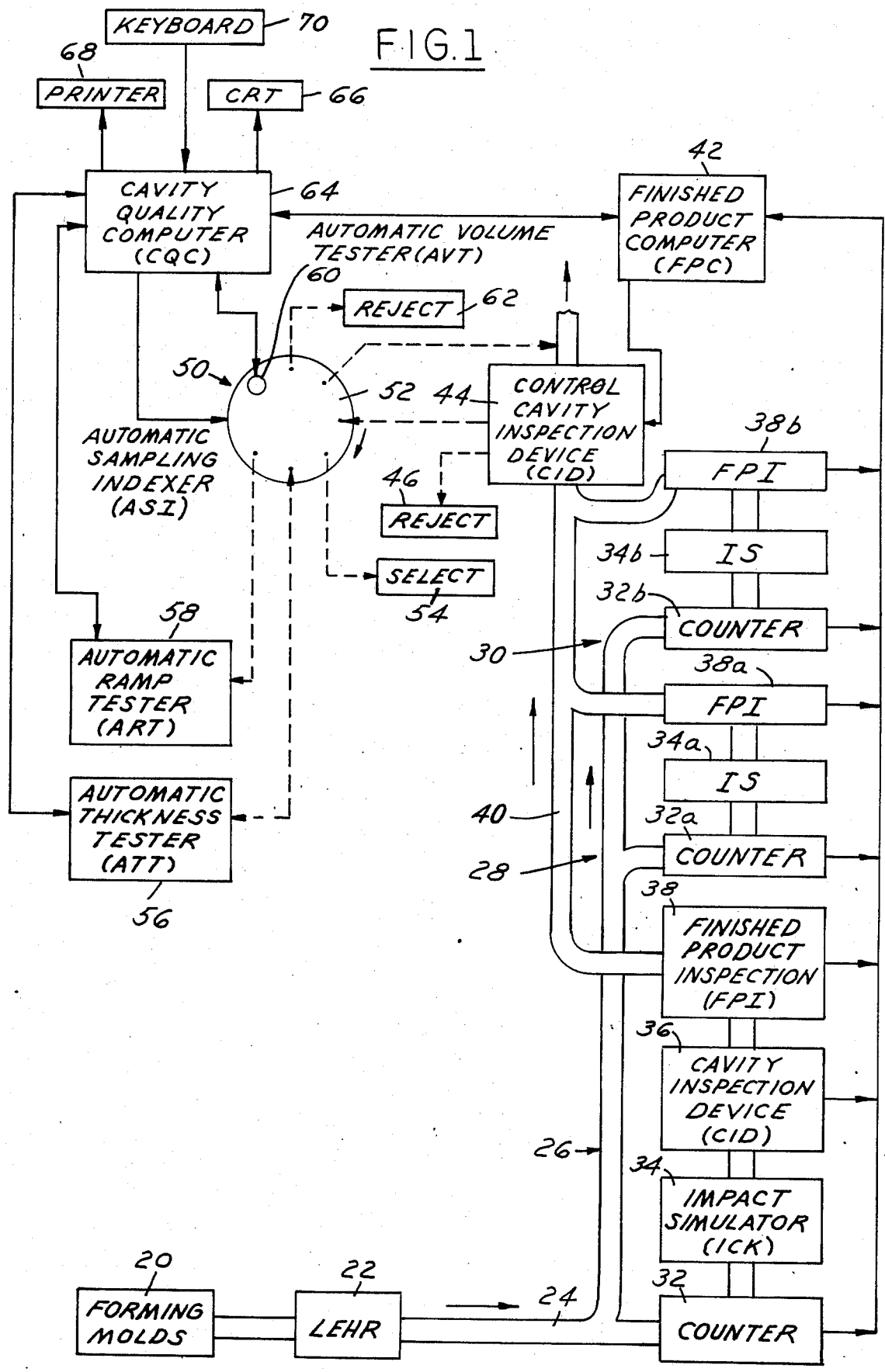
FIG. 1 is a schematic diagram of an automated system for inspection and sorting of molded containers in accordance with a presently preferred embodiment of the invention.

Referring to FIG. 1, containers such as glass bottles are formed in production cavities or molds 20 in a conventional and well-known individual section or IS glassware forming machine (not shown). Each cavity impresses or forms in containers molded therein a unique identifying code which is readable for associating the container with its mold of origin. The containers are fed to an annealing lehr 22 which typically includes a plurality of temperature zones for heating and cooling the formed containers for added strength and desirable finish characteristics. Containers exiting lehr 22 are sufficiently cooled in temperature to permit inspection and packaging operations. Lehr 22 thus separates the so-called "hot end" of a container production facility from the so-called "cold end" in which inspection and packaging take place.

Containers exiting lehr 22 are fed randomly along a conveyor path 24 to multiple parallel inspection loops 26,28 and 30. Inspection loop 26 is a so-called primary inspection loop and includes a counter 32 for counting the number of containers received therein. An impact simulator or ICK 34 receives containers from counter 32 for testing the containers for structural defects, principally sidewall defects, by applying pressure to a portion of the circumference of the container sidewalls. Containers are fed from ICK 34 to a cavity inspection device or CID 36 which reads the codes or indicia on containers fed through inspection loop 26 and associates such containers with their molds of origin. The containers are then fed to and through a multiple station finished product inspection or FPI device 38 wherein the containers are inspected for sidewall and finish defects, diameter and height variations, eccentricity, etc. Inspection containers are fed to a conveyor 40. Secondary inspection loops 28,30 include respective counters 32a, 32b, impact simulators 34a,34b and finished product multistation inspection devices 38a,38b. Containers exiting FPIs 38a,38b are fed to conveyor 40. Counters 32,32a and 32b, FPIs 38,38a and 38b, and CID 36 are all connected to a finished product computer or FPC 42 for analysis and correlation of defect data with mold cavities. A control cavity inspection device or CID 44 receives and reads the cavity code on all containers fed thereto by conveyor 40. CID 44 is connected to FPC 42 for receiving control information indicative of defective mold cavities and for feeding all containers bearing the corresponding cavity codes to a reject station 46.

In general, since the containers exiting lehr 22 are fed randomly to primary inspection loop 26 and secondary inspection loops 28,30, it can be assumed that cavity defects noted in all inspection loops are associated with cavity molds in the same manner as is defect information obtained in primary loop 26. Thus, cavity codes read by CID 36 and fed to FPC 42 are correlated in FPC 42 with defect information received from FPIs 38,38a and 38b based upon sampling information received from counters 32,32a and 32b. When a defective cavity is identified by FPC 42, the corresponding cavity code is fed to CID 44 and all containers bearing that cavity code are rejected. Exemplary impact simulators 34,34a and 34b are disclosed in U.S. Pat. No. 3,991,608. Multistation finished product inspection devices 38,38a and 38b are illustrated in U.S. Pat. Nos. 3,313,409 and 3,757,940. Supplemental thereto, U.S. application Ser. No. 424,687 filed Sept. 27, 1982 and Ser. No. 602,862 filed Apr. 23, 1984 (D15811) disclose optical systems and methods for identifying sidewall defects in containers, which may be incorporated into such finish product inspection devices. Likewise, U.S. application Ser. No. 473,285 filed Mar. 8, 1983 and Ser. No. 756,539 filed July 19, 1985 disclose systems and methods for optically inspecting the finish of glass containers, which may be incorporated into such finished product inspection devices. U.S. Pat. Nos. 4,175,236, 4,230,219 and 4,230,266 disclose cavity inspection devices or CIDs for reading imprinted cavity indicia as a function of rings molded into the bottoms of the containers. U.S. application Ser. No. 720,336 filed Apr. 5, 1985 discloses a cavity inspection device wherein molds of origin of containers are identified by reading container codes manifested in a series of bumps or protrusions which extend in an array around the container heel. The combination of FPC 42, CID 44 and inspection loops 26,28,30, to the extent thus far described, is disclosed in U.S. Pat. No. 4,413,738 noted above. All of such patents and applications are assigned to the assignee hereof.

In accordance with the present invention, an automatic sampling indexer or ASI 50 includes a starwheel or other suitable conveyor 52 for selectively receiving containers from control CID 44 and for indexing such containers among a plurality of physical inspection stations. For example, such stations may include a select station 54 wherein sampled containers from selected cavities are held for physical inspection by plant quality control personnel. An automatic thickness tester or ATT 56 is connected to ASI conveyor 52 for receiving and inspecting wall thickness on sampled containers fed thereto. An automatic ramp tester or ART 58 is likewise coupled to ASI conveyor 52 for measuring internal rupture pressure of selected sample containers. ART 58 preferably comprises a four-section device wherein containers are clamped and held by the container finish. The finish clamp uses non-metallic replaceable inserts to prevent damage to the container. The containers are filled with water to overflow and then hydrostatically pressurized to destruction at a rate of four samples per minute. Unbroken containers and miscellaneous glass particles are flushed into a cullet system. At an automatic volume test or AVT station 60, the internal volume of sampled containers on conveyor 52 are tested. Defective containers on conveyor 52 may be fed to a reject station or bin 62, while containers that pass all non-destructive physical tests may be returned to conveyor 40 downstream of control CID 44. It will be appreciated that the physical test stations 56,58 and 60 illustrated in FIG. 1 and described hereinabove, as well as the sequence of test and select stations around conveyor 52, are exemplary.

A cavity quality computer or CQC 64 receives thickness test information from ATT 56, rupture pressure information from ART 58 and volume test information from AVT 60, and controls operation of ASI 50 for indexing sampled containers among the various test stations. CQC 64 is also connected to FPC 42 for receiving inspection information therefrom and for controlling CID 44 to selectively feed containers to ASI 50 on a sampled basis as a function of cavity code. Thus, finished containers may be selectively automatically sampled for testing at ASI 50 on the basis of associated cavity identification, and cavity identifications of containers determined to be defective at ASI 50 are tracked and noted by CQC 64. Routing of sampled containers to select station 54 and reject station 62 from ASI 50 is likewise controlled by CQC 64. CQC 64 is connected to an operator CRT 66 for displaying control information to an operator, to a printer 68 for preparing suitable quality reports, and to an operator keyboard 70 for receiving cavity information and suitable control instructions.

In accordance with an important feature of the present invention, among the information stored in and employed by CQC 64 for inspection control purposes, is an information table or map relating mold cavities by number to cavity location and section of the IS forming machine. This cavity map is useful in identifying trends that are not only related to a particular cavity, but can be traced to a section of the IS machine. Containers from cavities which do not appear on the map are automatically flagged for one hundred percent sampling at CID 44 over a preselected number of containers to certify quality of a new cavity. Likewise, new cavity information may be implemented by operator keyboard 70. CQC 64 controls selection of containers from all cavities on a sampled basis, including cavities which are suspect or previously identified as defective, for the purpose of confirming or recertifying quality of such cavities after repair or replacement. In this way, cavity quality information is continuously and automatically maintained and updated, and is available to an operator on request.

Figure 2:
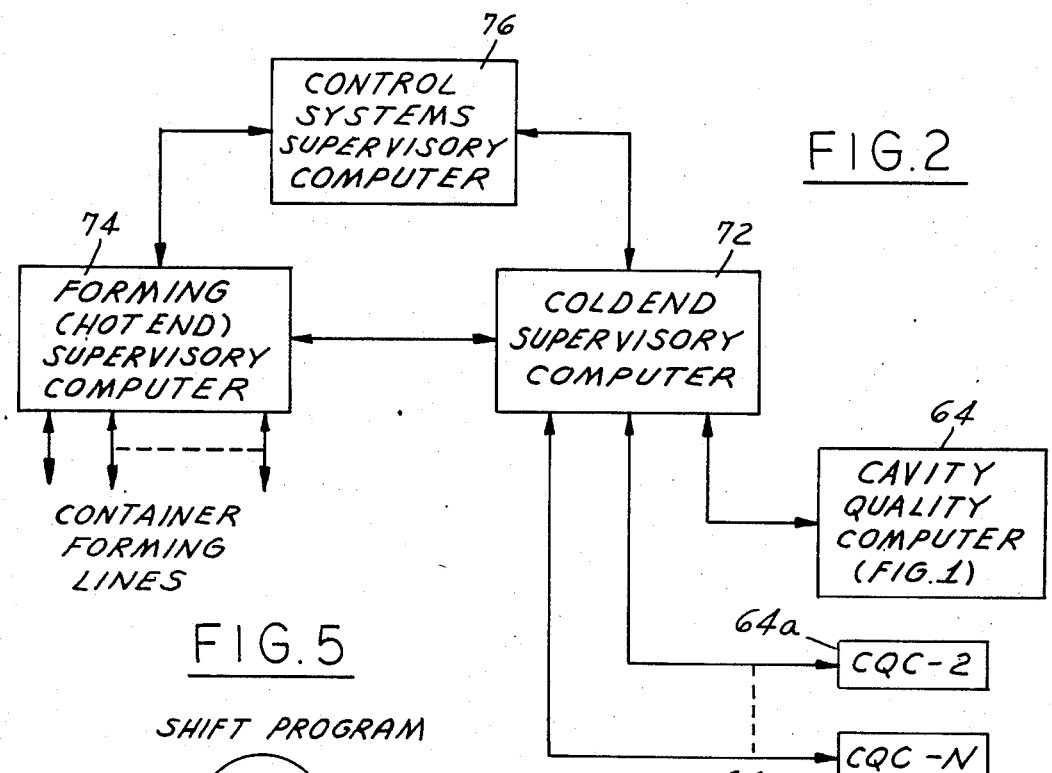
FIG. 2 is a fragmentary functional block diagram of a modification to the embodiment of FIG. 1.

FIG. 2 illustrates implementation of the inspection system of FIG. 1 in a fully automated plant for manufacture of containers containing multiple forming and inspection lines. CQC 64, together with additional CQCs 64a-64n from other inspection lines, are connected to a cold-end supervisory computer or CSC 72. A forming or hot-end supervisory computer 74 is interconnected with cold-end supervisory computer 72 for automatic transfer of information therebetween, and is also connected (in a manner not shown) for monitoring and controlling the container forming processes in the various forming lines. FSC 74 and CSC 72 are connected to a master plant control system supervisory computer or CSSC 76. CSC 72 includes facility for archival storage of production data and transmits information, including cavity map information, to each of the CQCs 64-64n. Thus, in the fully automated system of FIG. 2, CRT 66, printer 68 and keyboard 70 would be connected to either CSC 72 or CSSC 76.

Figure 3:
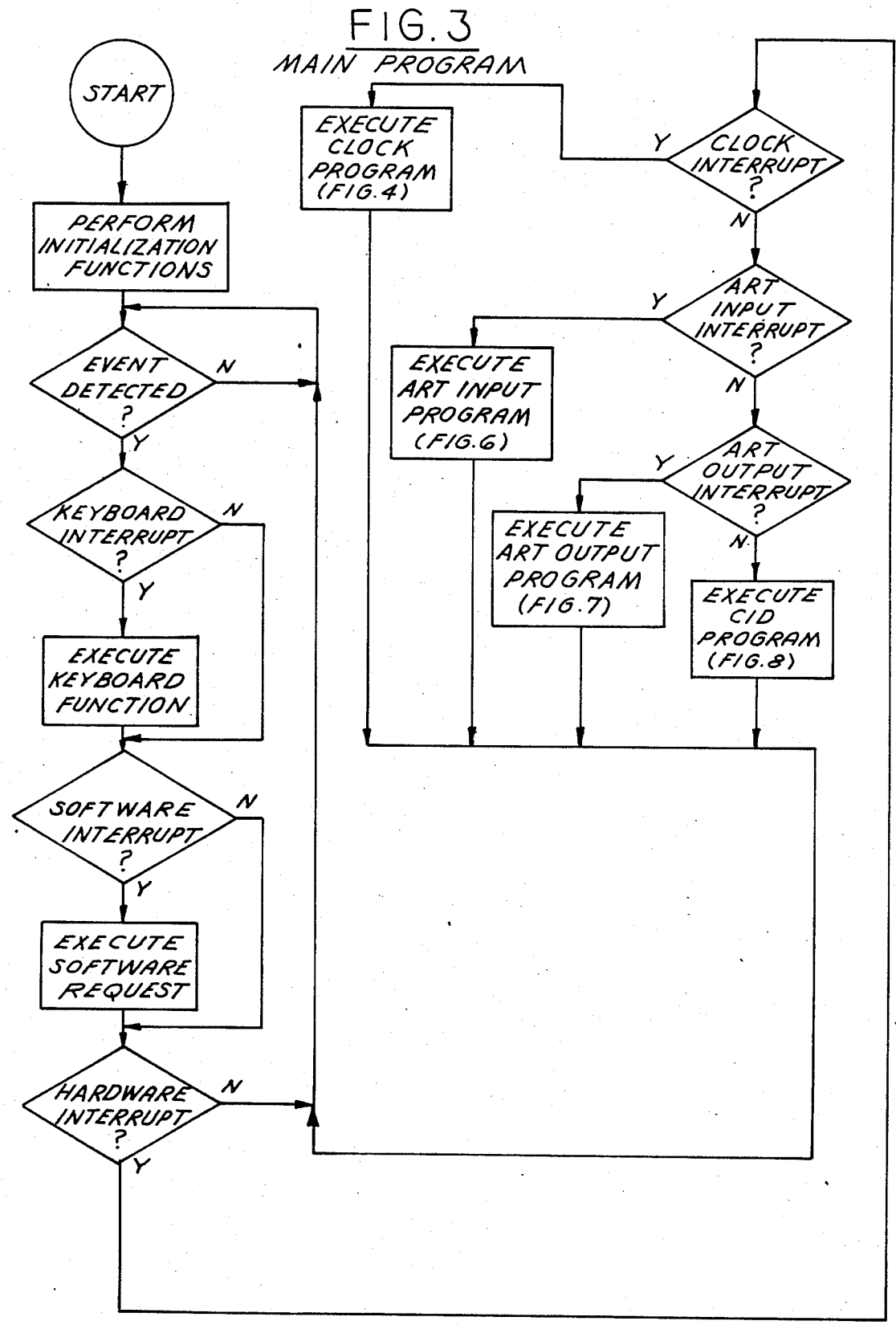

FIGS. 3-10 are flow charts which illustrate operation of CQC 64 in an embodiment of the system of FIG. 1 wherein ASI 50 includes only ART 58. FIG. 3 illustrates the main operating program. Upon startup, data structures, interrupts and other functions are initialized in preparation for operation. The program then waits for detection of an event, i.e. an interrupt, and identifies and executes the appropriate interrupt subroutine when an event is detected. If an interrupt from keyboard 70 is received, the corresponding keyboard function is executed to store the information or implement the command desired by the keyboard operator. A software interrupt from another portion of the program results in execution of the corresponding software request. Keyboard and software interrupt operations are conventional. If a hardware interrupt is detected, the program determines whether such interrupt originated at an internal clock, the input to ART 58, the ART data output or the control CID 44, and executes the appropriate corresponding subroutine at FIGS. 4, 6, 7 and 8 respectively. Upon completion of such hardware subroutine, or in the event that a hardware interrupt is not detected, operation returns to the point at which the program monitors for detection of an event. It will be appreciated that, although the interrupts are illustrated serially in FIG. 3, such interrupts are priority driven and may be serviced at any point during operation.

Figure 4:
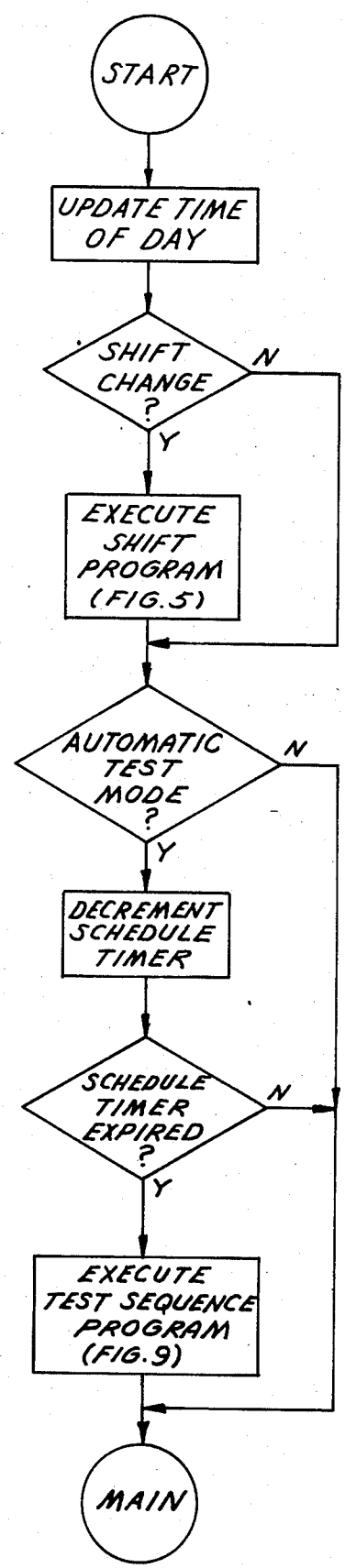
Figure 9:
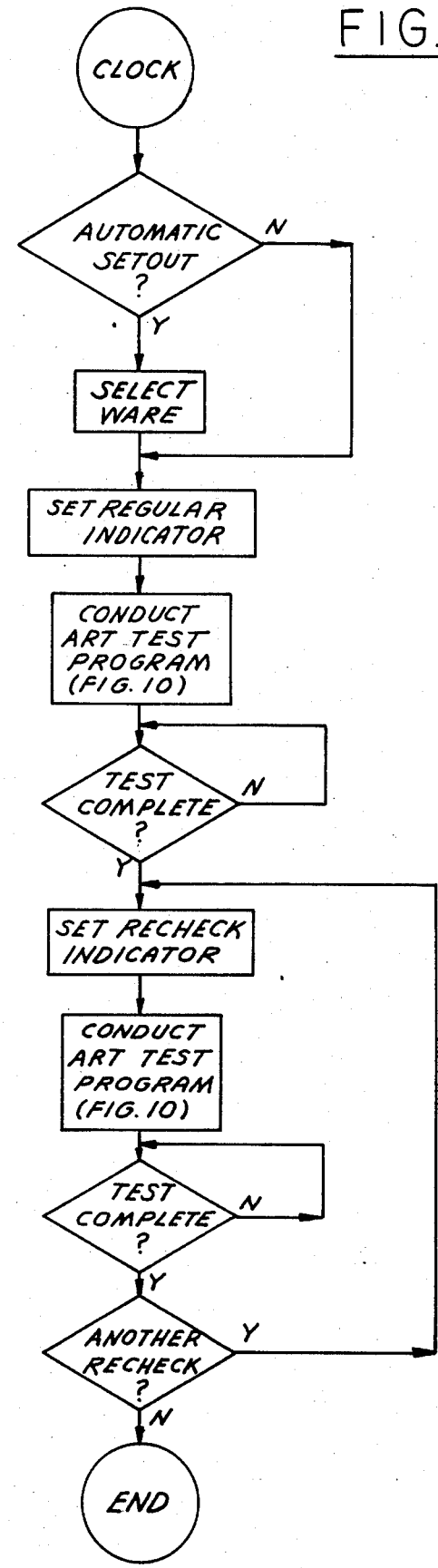

FIG. 4 illustrates operation of the clock program subroutine to which operation branches in the event of detection of a clock hardware interrupt in the main routine of FIG. 3. CQC 64 initially updates its internal clock and calendar, and then determines if internal clock time corresponds to a plant shift change. If so, operation branches to the shift change subroutine of FIG. 5. A test is then made to determine if the automatic test mode of operation has been selected at operator keyboard 70. If not, operation returns to the main routine of FIG. 3. On the other hand, if an automatic test mode has been selected, a test schedule timer is decremented and the timer is then tested to determine if the automatic test time, which may be on the order of thirty minutes for example, has expired. If so, the automatic test sequence program of FIG. 9 is executed, and operation returns to the main routine of FIG. 3. On the other hand, if the test timer has not expired, operation simply returns to the main routine.

FIG. 5 illustrates operation of the shift change subroutine. If a plant shift change is indicated in the clock routine of FIG. 4, all quality information stored in CQC 64 (FIG. 1) is first placed in permanent storage on hard disk, magnetic tape or the like. System data, such as the cavity map data, is then updated from storage to reflect operation during the up-coming shift. Reports of system operation during the previous shift are prepared at printer 68 (FIG. 1), and all previous shift data is then cleared from memory. Operation of the shift change subroutine then terminates.

FIG. 6 illustrates operation of the ART input program to which operation branches in the event that an ART input interrupt is detected in the main program of FIG. 3, indicating that a container has been received at ART 58 (FIG. 1). Cavity identification data on the CQC input channel connected to ART 58 is read to determine if the container so received at ART 58 corresponds to the container expected at the tester. If the container received was not expected, operation returns to the main routine of FIG. 3. On the other hand, if the container in question corresponds to that selected for sampling by CQC 64, container test parameters are downloaded to ART 58. Operation then returns to the main routine of FIG. 3 while the pressure tests are performed at the ART. FIG. 7 illustrates operation of the ART output routine to which operation branches in the event that an ART output interrupt is detected in the main routine of FIG. 3,—i.e., after completion of container test at the ART. Data on the output channel of ART 58 (FIG. 1) to CQC 64, indicative of container cavity code and corresponding rupture pressure, is read and stored, an interrupt event is declared, and operation returns to the main routine of FIG. 3.

FIG. 8 illustrates operation of the CID interrupt routine in the event that an interrupt is received from control CID 44 (FIG. 1). Initially, container cavity data is read and a determination is made whether the cavity so indicated is one which is to be sample-select for test at ASI 50. If not, a decision is then made whether the cavity code is one which has been found by primary inspection loop 26 to produce defective containers. If so, a corresponding reject code is transmitted to control CID 44 through FPC 42, and CID 44 functions to route the container to reject station 46. On the other hand, if the cavity in question is one which is selected for sample test at ASI 50, a corresponding code is transmitted to CID 44 through FPC 42 and the container is fed to ASI conveyor 52. The cavity code is stored for later reference following completion of the sample tests and an event is declared. Whenever an interrupt is received from CID 44, the cavity code of the container at CID 44 is included on the active cavity map, and operation then returns to the main routine of FIG. 3.

Figure 10:
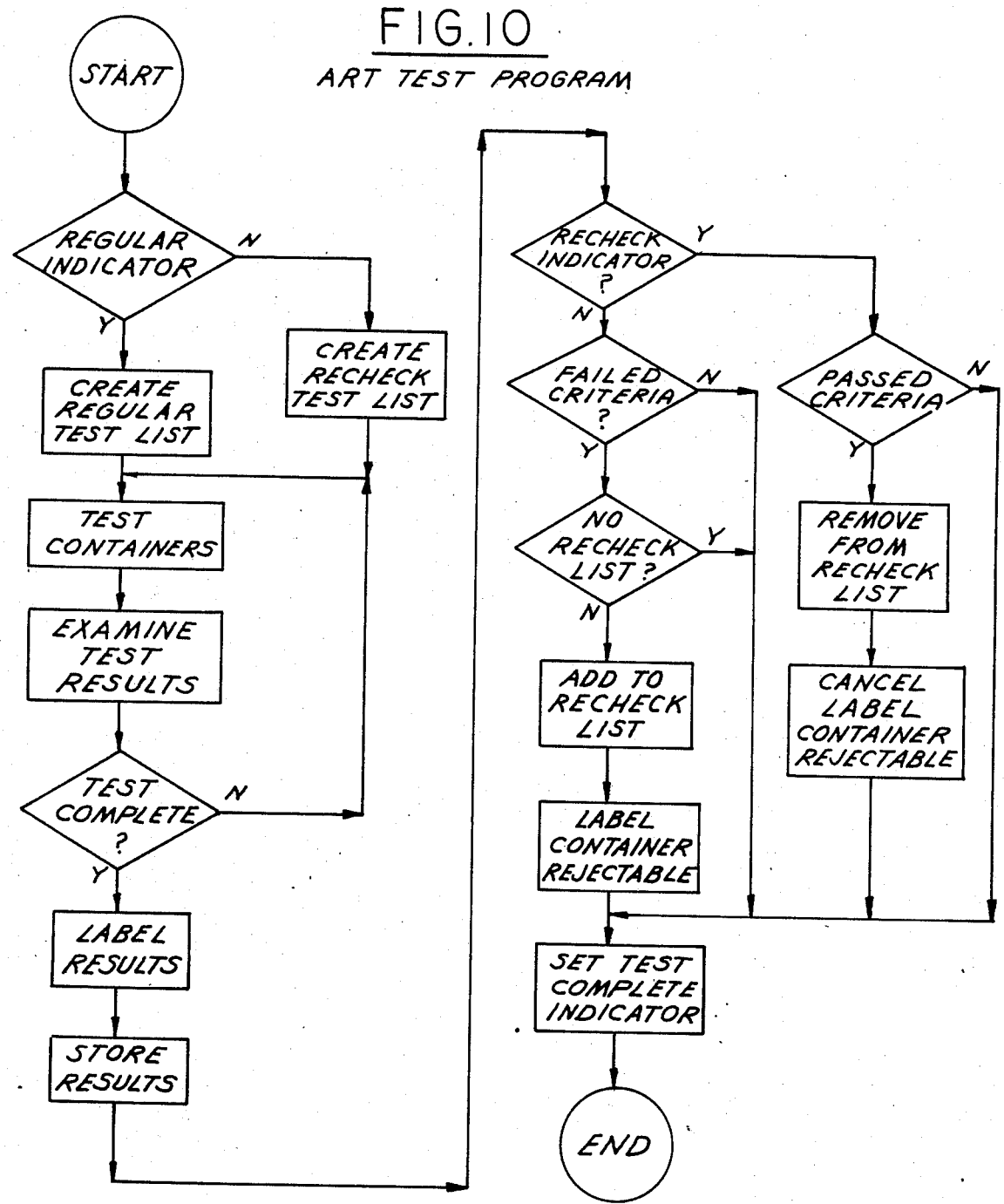

FIG. 9 illustrates operation of the automatic test sequence routine which is entered from FIG. 4 in the event that an automatic test mode has been selected at keyboard 70 (FIG. 1) and the automatic test schedule timer has expired. In the automatic test routine or program, CQC 64 first determines if an automatic setout mode has been selected at operator keyboard 70. If so, control CID 44 is monitored through FPC 42, and one container specimen or sample from each cavity is automatically routed to select station 54 for manual inspection by quality control personnel. Upon completion of this automatic setout routine, or in the event that automatic setout has not been selected, a normal or regular test sequence is initiated and a regular test indicator is set. In this normal test sequence, one sample container from each cavity—i.e., one container bearing each code in the cavity map—is automatically routed by CID 44 to ART 58 and tested for rupture pressure (FIG. 10). Operation of the automatic test sequence program idles until such normal test sequence is complete, during which ART input, ART output and CID interrupt programs of FIGS. 6–8 and periodically function as previously described.

After one container from each active cavity has been tested, indicating that the regular test routine has been completed, a determination is made whether containers from one or more cavities should be rechecked and, if so, a recheck indicator is set and the ART test subroutine of FIG. 10 is again initiated for the cavities to be rechecked. Upon completion of such recheck, a decision is made whether another recheck is indicated and whether sufficient time remains before initiation of another automatic test sequence. If no further recheck is warranted or if insufficient time remains for another recheck, the automatic test sequence subroutine of FIG. 9 is terminated.

FIG. 10 illustrates operation of the ART automatic test program. A check is first made to determine if the regular test indicator of FIG. 9 has been set. If so, a regular test is indicated and a regular test list containing all active cavity codes is created. If the regular test indicator has not been set, which means that a recheck mode (FIG. 9) is indicated, a list is compiled of cavity IDs to be rechecked. In either event, CID 44 (FIG. 1) is controlled through FPC 42 to select one sample container bearing each cavity code on the list (regular or recheck). Each container is routed to ART 58, tested for rupture pressure, and the test results are stored in CQC 64 as a function of cavity code. This process continues until the test is completed, either because all cavity codes on the applicable list have been tested, or because the automatic test sequence timer (FIG. 4) has timed out, indicating that a new automatic test routine should be initiated.

When the regular or recheck test has been completed, the test results for each cavity code are compared in CQC 64 against applicable test criteria and labelled as having passed or failed such criteria. In particular, rupture pressure for each cavity code is compared against predetermined standards, and a test failure is indicated where rupture pressure is below a preselected threshold. The test results are then stored, and the recheck indicator is tested. If the recheck indicator is not set, meaning that the regular indicator is set and a regular test routine is in operation, cavity ID for each cavity which failed the test criteria is compared with a cavity recheck list stored in CQC memory and indicative of suspect or defective cavities. If the failed cavities are already on the recheck list, the test complete indicator is set. On the other hand, if the cavity (or cavities) which failed the test criteria is not on the recheck list, it is added to the recheck list and that cavity code is labelled rejectable. FPC 42 is thus advised that all containers bearing that cavity code (and all other codes on the recheck list) should be rejected, and control CID 44 (FIG. 1) is thus controlled by FPC 42 to reject all containers from cavities on the cavity recheck list.

If the recheck indicator test in FIG. 10 indicates that the ART test routine is part of a recheck cycle in FIG. 9, cavity codes for containers which passed the test criteria are removed from the recheck list, and the label or flag which indicates that that container code is rejectable is correspondingly cancelled. Thus, cavity codes are removed from the recheck list only during a recheck test sequence with the recheck indicator set. FPC 42 thereafter controls control CID 44 to pass containers from the recertified cavity unless and until the cavity is again added to the recheck list. When the ART test complete indicator is set, the automatic ART test program is complete.

An advantage of the invention hereinabove described lies in the fact that the pressure test criteria may be more sophisticated than the simple pass/fail criteria hereinabove described. For example, cavities may be listed for test at each regular test interval or at varying test intervals depending upon cavity history. In this way, a cavity which produces satisfactory containers need not be retested at each regular test interval, leaving more test time for recertification of cavities on the recheck list. Pressure test data may be qualified by CQC 64, so that cavity retest interval may vary directly with test results as well as test history.

Control and operation of AVT 60 and ATT 56 (FIG. 1) is implemented along lines heretofore discussed in detail with reference to ART 58. AVT 60 identifies cavity codes associated with containers having high or low internal volumes, with such cavity codes being labelled rejectable at CID 44 and added to an AVT recheck list. In the same way, ATT 56 identifies cavity codes associated with containers having a too-thin or too-thick wall. In this connection, it will be appreciated that ASI 50 and ASI conveyor 52 are controlled by CQC 64 to selectively route sampled containers from CID 44 to one or more of the physical test stations as a function of cavity code. Thus, during a test sequence, the first sampled container received from CID 44 may be fed to ATT 56, the second to AVT 60 while bypassing ATT 56 and ART 58, etc., depending upon the sequence in which the containers are received and sampled at CID 44 and the recheck lists upon which the cavity codes appear.

The invention claimed is:

1. A system for inspecting and sorting molded containers formed in a mold machine having a plurality of mold cavities, each said container containing readable indicia indicative of mold cavity of container origin, said system comprising first conveyor means for transporting containers along a predetermined path, inspection means disposed in said path for inspecting containers travelling in said path and including first cavity identification means for identifying mold cavity of origin of defective containers, second cavity identification means disposed in said path for reading said indicia on containers travelling in said path and including means for selectively sorting containers from said path as a controllable function of cavity identification, first control means coupled to said inspection means for receiving information identifying mold cavity of origin of defective containers and to said second cavity identification means for selectively controlling said second cavity identification means to sort all containers having indicia indicative of mold cavities of defective containers, sample testing means including second conveyor means coupled to said second cavity identification means for receiving a sampling of said containers from said path, and means coupled to said second conveyor means for automatically testing physical quality of said sampled containers and identifying mold of origin of defective ones of said sampled containers, and second control means coupled to said sample testing means and through said first control means to said second cavity identification means for automatically sorting said sampling of containers wherein said sample comprises a preselected sample of containers from each cavity and routing said preselected sample of containers to said sample testing means, said second control means including means forming a cavity map which relates cavity identification to physical location of the associated mold cavity in the mold machine, means responsive to said first control means for identifying mold cavity indicia read by said second cavity identification means associated with mold cavities absent from said map, and means for automatically routing a preselected number of consecutive containers bearing said absent indicia to said automatic sample testing means to certify quality of said absent cavity.

2. The system set forth in claim 1, wherein said second control means includes means responsive to said first control means and to said sample testing means for identifying defective mold cavities on said map.

3. The system set forth in claim 2 wherein said sample testing means includes a plurality of test stations coupled to said second conveyor means and to said second control means for selectively performing differing quality tests on containers in said second conveyor means as a function of cavity identification associated with said containers.

4. The system set forth in claim 3 wherein said second control means includes means responsive to said plurality of test stations for automatically varying said preselected sample of containers as a function of cavity identification to reflect containers identified as defective by said test stations.

5. The system set forth in claim 4 wherein said plurality of test stations includes means coupled to said second control means and to said second conveyor means for selectively automatically testing internal rupture pressure of containers and identifying mold cavity of origin associated with containers having rupture pressure below a preselected threshold.

6. The system set forth in claim 5 wherein said plurality of test stations further includes means coupled to said second control means and to said second conveyor means for selectively automatically testing internal volume of containers carried by said second conveyor means and identifying mold cavity of origin associated with containers having internal volumes which depart from a preselected standard.

7. The system set forth in claim 6 wherein said plurality of test stations further includes means coupled to said second control means and to said second conveyor means for selectively automatically testing wall thickness of containers carried by said second conveyor means and identifying mold cavity indicia associated with containers having wall thickness which departs from a preselected standard.

8. The system set forth in claim 4 wherein said sample testing means includes means responsive to said second control means for automatically sorting all containers bearing mold cavity indicia identified by said second control means.

9. The system set forth in claim 4 wherein said sample testing means further comprises means for returning acceptable containers to said path.

10. The system set forth in claim 2 further comprising display means responsive to said second control means for indicating defective mold cavities.

11. The system set forth in claim 10 further comprising data entry means for adding new mold cavity indicia to said map.

12. A method for inspecting and sorting molded containers formed in a mold machine having a plurality of mold cavities, each of said containers containing readable indicia indicative of mold cavity of container origin, said method comprising the steps of:
- (a) maintaining a cavity map containing indicia which relates all operating mold cavities to physical location in the mold machine,
- (b) transporting containers molded in such machine along a predetermined inspection path,
- (c) inspecting containers travelling in said path for defects associated with said cavities and identifying cavities on said map associated with defective containers,
- (d) reading said indicia on containers travelling in said path and selectively sorting containers from said path which bear indicia corresponding to said mold cavities identified in said step (c),
- (e) identifying mold cavity indicia read in said step (d) associated with mold cavities absent from said map,
- (f) automatically routing a preselected number of containers bearing said indicia identified in step (e) to automatic sample testing means, and
- (g) automatically testing at said sample testing means physical quality of containers routed thereto in said step (f) to certify quality of cavities identified in said step (e) absent from said map.

* * * * *